United States Patent
Nancekievill

(10) Patent No.: US 6,742,012 B2
(45) Date of Patent: May 25, 2004

(54) APPARATUS AND METHOD FOR PERFORMING MULTIPLICATION OPERATIONS

(75) Inventor: Alexander Edward Nancekievill, Great Abington (GB)

(73) Assignee: Arm Limited, Cambridge (GB)

( * ) Notice: Subject to any disclaimer, the term of this patent is extended or adjusted under 35 U.S.C. 154(b) by 594 days.

(21) Appl. No.: 09/748,152

(22) Filed: Dec. 27, 2000

(65) Prior Publication Data

US 2002/0116434 A1 Aug. 22, 2002

(51) Int. Cl.$^7$ ................................................. G06F 7/52
(52) U.S. Cl. ....................................................... 708/625
(58) Field of Search .......................................... 708/625

(56) References Cited

U.S. PATENT DOCUMENTS 5,898,604 A * 4/1999 Winterer ..................... 708/625

* cited by examiner

Primary Examiner—David H. Malzahn
(74) Attorney, Agent, or Firm—Nixon & Vanderhye P.C.

(57) ABSTRACT

The present invention provides an apparatus and method for processing data using a multiplying circuit for performing a multiplication of a W/2 bit data value by a W bit data value. An instruction decoder is provided which is responsive to a multiply instruction to control the multiplying circuit to generate a multiplication result for the computation M×N, where M and N are W bit data words. The multiplying circuit is arranged to execute a first operation in the which the data word N is multiplied by the most significant W/2 bits of the data word M to generate a first intermediate result having 3W/2 bits, and to then execute a second operation in which the data word N is multiplied by the least significant W/2 bits of the data word M to generate a second intermediate result having 3W/2 bits. The first intermediate result is shifted by W/2 with respect to the second intermediate result and added to the second intermediate result to generate the multiplication result. By performing the two parts of the multiplication in reverse order to the conventional approach, it has been found that the complexity of the circuitry can be reduced, and a reduction in power consumption can be achieved.

17 Claims, 6 Drawing Sheets

APPARATUS AND METHOD FOR PERFORMING MULTIPLICATION OPERATIONS

BACKGROUND OF THE INVENTION

This invention relates to the field of data processing systems. More particularly, this invention relates to data processing systems of the type that perform multiplication operations.

There are a number of ways in which multiplication of two W bit numbers M and N may be performed. For example, a W×W bit multiplier may be provided for producing the multiplication result M×N directly. However, the larger the multiplier circuit is, then generally the more power and circuit area it will consume, and accordingly in applications where reduction in power and circuit area are of importance, it is known to provide a W×W/2 multiplier that can perform two separate multiplications which are then summed together to produce the result M×N. Hence, the multiplication M×N is performed as follows:

$$M_{lower} \times N + M_{upper} \times N$$

In the above equation, $M_{lower}$ indicates the least significant W/2 bits of M, whereas $M_{upper}$ indicates the most significant W/2 bits of M. The first multiplication above will be referred to as the lower multiplication, whilst the second multiplication will be referred to as the upper multiplication.

Both of the above multiplications produce a result which is 3W/2 bits wide, but the upper multiplication result is shifted to be W/2 bits more significant than the lower multiplication result. Hence, when the two multiplication results are added, the final multiplication result will be 2W bits wide as indicated below:

```
Lower Product      A A A
Upper Product +  B B B
                 ─────────
                 C C C C
```

(where each capital letter represent a W/2 bit number)

Such a multiplication is typically achieved by calculating the lower multiplication result $M_{lower} \times N$ first, and then recirculating part of the result for accumulation into the upper multiplication $M_{upper} \times N$. It should be noted that the least significant W/2 bits of the final multiplication result are identical to the least significant W/2 bits of the lower product, but the same does not apply for the most significant W/2 bits of the final multiplication result when compared with the most significant W/2 bits of the upper product, because a carry may propagate up the chain.

Although the upper and lower products are shown offset from each other by W/2 bits, they are produced in the same bit positions in the final adder of the multiplier. This has the consequence that the least significant W/2 bits of the final multiplication result, which are available once the lower product has been calculated, must be stored immediately, because they will be overwritten by the rest of the multiplication result after the upper product has been calculated and added to the relevant bits of the lower product. Extra logic then needs to be provided to produce the final multiplication result from the two intermediate results, i.e. the previously stored least significant W/2 bits of the multiplication result and the rest of the multiplication result subsequently output by the final adder of the multiplier. In addition, further logic is also required to allow full carry propagation when performing an accumulation of the two separate multiplication results as discussed above.

Generally, it is desirable to reduce power consumption and circuit complexity wherever possible, and accordingly it would be desirable to provide a technique which enables two W bit data words to be multiplied together using a multiplying circuit that is arranged to perform a multiplication of a W2 bit data value by a W bit data value whilst enabling reduction in the power consumption and complexity of the multiplying circuit in relation to the above discussed prior art.

SUMMARY

Viewed from a first aspect, the present invention provides apparatus for processing data, said apparatus comprising: a multiplying circuit for performing a multiplication of a W/2 bit data value by a W bit data value; an instruction decoder responsive to a multiply instruction to control said multiplying circuit to generate a multiplication result for the computation M×N, where M and N are W bit data words, the multiplying circuit being arranged to execute a first operation in which the data word N is multiplied by the most significant W/2 bits of the data word M to generate a first intermediate result having 3W/2 bits, and to then execute a second operation in which the data word N is multiplied by the least significant W/2 bits of the data word M to generate a second intermediate result having 3W/2 bits, the first intermediate result being shifted by W/2 with respect to the second intermediate result and added to the second intermediate result to generate the multiplication result.

In accordance with the present invention, a multiply instruction is provided which causes the multiplying circuit to perform the two constituent multiplication operations in reverse order to that performed in the earlier-described prior art approach. Since the first operation is used to multiply the data word N with the most significant W/2 bits of the data word M, this first operation will not directly produce any bits of the multiplication result, and accordingly any final adder circuitry provided within the multiplying circuit can be turned off when the first operation is executing, thereby reducing power consumption. Further, since none of the bits of the multiplication result are produced by the first operation, the multiplying circuit will not output any bits after execution of the first operation which require storing, and further there is no need for any extra logic as was required in the prior art approach to concatenate a data value output after execution of the first operation with a data value produced in a subsequent operation.

The prior art approach, whereby the least significant W/2 bits of the multiplicand are multiplied by the multiplier, and then the upper W/2 bits of the multiplicand are multiplied by the multiplier, with the appropriately shifted results then being summed to produce the final multiplication result, is the most intuitive approach, as it appears in keeping with the requirement to propagate a carry from the least significant bit to the most significant bit where necessary. Further, this prior art approach would appear to provide good processing speed in certain instances, since considering the example where a 2W bit result is to be produced, the least significant W/2 bits of the result are generated from the lower product and the remaining 3W/2 bits are generated from the upper product, i.e. only two operations seem necessary.

However, in practice, the perceived speed of the prior art approach is often adversely affected, since, for example, the register bank into which the result needs to be placed may comprise W bit registers, and may only have one write port.

In such situations it takes two cycles to write to the register bank the 3W/2 bits of the result produced by the upper product.

In contrast to the prior art approach, the approach of the present invention, whereby the two operations are reversed, is entirely counterintuitive, but has been found to produce the above-described surprising benefits of reducing the overall complexity of the data processing apparatus, and facilitating reduction in power consumption.

In accordance with a first embodiment, the multiply instruction specifies a W bit multiplication result, and the second operation is further arranged to cause the multiplying circuit to sum the least significant W bits of the first and second intermediate result to generate a third intermediate result having 3W/2 bits, the multiplication result being given by the least significant W bits of the third intermediate result. In accordance with this embodiment, the W bit multiplication result is produced in one go at the end of the second operation. It will be seen that when compared with the standard prior art approach, where the least significant W/2 bits are produced after execution of the first operation, the most significant W/2 bits are produced after execution of the second operation, and then extra logic is provided to concatenate together the two separate parts of the results, the technique of the preferred embodiment of the present invention enables the complexity of the data processing apparatus to be significantly reduced, by avoiding the need for such extra logic. Further, as mentioned earlier, since no part of the multiplication result is output by the multiplying circuit after the first operation, any final adder circuitry within the multiplying circuit can be turned off during execution of the first operation, thereby conserving power.

In accordance with a second embodiment of the present invention, the multiply instruction specifies a 2W bit multiplication result, the second operation is further arranged to cause the multiplying circuit to sum the least significant W bits of the first and second intermediate result to generate a third intermediate result having 3W/2 bits, and the multiplying circuit is further arranged to execute a third operation in which the most significant W-bits of the third intermediate result and the most significant W/2 bits of the first intermediate result are summed to generate a fourth intermediate result having 3W/2 bits, the multiplication result being given by the least significant W bits of the third intermediate result and the most significant W bits of the fourth intermediate result.

Hence, in preferred embodiments, to produce a 2W bit multiplication result, three separate operations are required, the least significant W bits of the multiplication result being available after execution of the second operation, and the most significant W bits of the multiplication result being available after execution of the third operation. However, as mentioned earlier, the multiplying circuit does not output any data value when executing the first operation, and accordingly any final adder circuitry within the multiplying circuit can be turned off when executing the first operation.

Further, in preferred embodiments, the complexity is also reduced, since the result is written to two W bit registers, the least significant W bits being generated from the third intermediate result, and the most significant W bits being generated from the fourth intermediate result. This should be contrasted with the prior art approach where extra logic is needed to concatenate the least significant W/2 bits of the result with the next W/2 bits of the result generated by the subsequent operation, prior to the value being written to a W bit register.

It will be appreciated that the data words required by the multiplying circuit may be provided from any appropriate storage. However, in preferred embodiments, the apparatus further comprises: a register bank containing a plurality of registers for storing data words required by the multiplying circuit; wherein the multiplying circuit is a pipelined circuit comprising a partial product generating circuit provided in a first pipelined stage and an adder circuit provided in one or more subsequent pipelined stages for adding partial product values, wherein data words required for an operation at a particular pipelined stage are read from the register bank by the multiplying circuit before that operation enters that pipelined stage.

The use of a pipelined circuit provides a particularly efficient technique for executing the various operations that need to be performed by the multiplying circuit, whilst the use of a register bank provides a particularly efficient mechanism for making the data words available for the multiplying circuit as and when required.

Whilst the above described approach of preferred embodiments provides significant benefits over the prior art approach when solely performing a multiplication of two data words M and N, the benefits are particularly marked when performing multiply-accumulate operations. Accordingly, in preferred embodiments, the multiplying circuit is a multiply-accumulate circuit, and said multiply instruction is a multiply-accumulate instruction specifying at least one W bit accumulate data word O in addition to the data words M and N, the instruction decoder being responsive to the multiply-accumulate instruction to control said multiply-accumulate circuit to generate a multiply-accumulate result for the computation M×N+O, the multiply-accumulate circuit being arranged to execute the first operation to generate the first intermediate result having 3W/2 bits, and the second operation being further arranged to incorporate summation of the at least one accumulate data word O with the result of the multiplication of the data word N by the least significant W/2 bits of the data word M to generate a second intermediate result having 3W/2 bits, the first intermediate result being shifted by W/2 with respect to the second intermediate result and added to the second intermediate result to generate the multiply-accumulate result.

By the above approach, the accumulate data word O is not required until the second operation, and accordingly this provides additional time to prepare the accumulate data word O for inclusion in the multiply-accumulate operation. In certain implementations, this extra time can be particularly valuable, and can avoid the performance of the multiply-accumulate circuit being adversely affected by the need to include stall cycles whilst waiting for the accumulate data word O. For example, multiply instructions with accumulate are often used back-to-back, i.e. the next instruction uses the result of the previous instruction as its accumulate data word. With a pipelined processor, this can cause stall cycles to be inserted since, when using the prior art technique, the next instruction must wait for the previous instruction to complete before it can start, thereby reducing performance. However, in accordance with preferred embodiments of the present invention, where the multiplication is effectively performed in reverse, the accumulate data word is not actually required for the first operation, and hence the next instruction can actually begin before the previous instruction has completed, thereby enabling performance to be increased.

In a first embodiment, the multiply-accumulate instruction specifies a W bit multiply-accumulate result, and the second operation is further arranged to cause the multiply-accumulate circuit to sum the least significant W bits of the first and second intermediate result to generate a third intermediate result having 3W/2 bits, the multiplication result being given by the least significant W bits of the third intermediate result. Hence, as discussed earlier, the W bit multiply-accumulate result is produced in one go after completion of the second operation, thereby enabling the complexity of the circuitry to be reduced.

In accordance with the second embodiment, the multiply-accumulate instruction specifies a 2W bit multiply-accumulate result, the second operation is further arranged to cause the multiply-accumulate circuit to sum the least significant W bits of the first and second intermediate result to generate a third intermediate result having 3W/2 bits, and the multiply-accumulate circuit is further arranged to execute a third operation in which the most significant W-bits of the third intermediate result and the most significant W/2 bits of the first intermediate result are summed to generate a fourth intermediate result having 3W/2 bits, the multiply-accumulate result being given by the least significant W bits of the third intermediate result and the most significant W bits of the fourth intermediate result.

It will be appreciated that when the multiply-accumulate instruction specifies a 2W bit multiply-accumulate result, there is no requirement that any accumulate data words are only W bits in length. Accordingly in one embodiment, the multiply-accumulate instruction specifies a 2W bit accumulate data value in two data words O and P, where data word O represents the most significant W bits of the accumulate data value and data word P represents the least significant W bits of the accumulate data value, the summation of data word O into the multiplication being performed by the first operation, and the summation of data word P into the multiplication being performed by the second operation.

When executing such a multiply-accumulate instruction, the data word O representing the most significant W bits of the accumulate data value needs to be available for use by the first operation, whereas the data word P representing the least significant W bits of the accumulate data value is not required until the second operation is executed.

It will be appreciated that there is no requirement for the multiply-accumulate instruction to only specify a single accumulate data value, but rather a plurality of accumulate data values may be specified. In accordance with one embodiment, the multiply-accumulate instruction specifies two W bit accumulate data words O and P, the summation of both accumulate data words into the multiplication being performed by the second operation. Accordingly, such a multiply-accumulate instruction specifies a computation M×N+O+P.

Typically, such multiply-accumulate instructions which specify more than one accumulate data value can cause the multiply-accumulate circuit to introduce stall cycles if the interface with the memory storing the input data values does not allow all of those data values to be output at one time.

In preferred embodiments, the data words required by the multiplication circuit are stored within a register bank containing a plurality of registers, and the multiply-accumulate circuit is a pipelined circuit comprising a partial product generating circuit provided in a first pipelined stage and an adder circuit provided in one or more subsequent pipelined stages for adding partial product and accumulate values, and wherein data words required for an operation at a particular pipelined stage are read from the register bank by the multiply-accumulate circuit before that operation enters that pipelined stage.

If the prior art multiplication approach was employed, all of the accumulate data values would be required for use in the first operation, and hence in effect all of the data words M, N, O and P would have to be read from the register bank before the first operation could be executed. However, given cost and complexity considerations, a typical register bank will only be provided with a relatively small number of read ports, and hence the multiply-accumulate circuit may not be able to read all of the required data words at the same time. This can cause stall cycles to be inserted if the typical prior art multiplication approach is used, thereby adversely affecting performance.

In preferred embodiments, the register bank has three read ports. However, since the accumulate data words are not actually required for the first operation, this constraint does not adversely affect performance. Instead, in accordance with preferred embodiments, the multiply-accumulate circuit is arranged to read the first accumulate data word O from the register bank before the first operation enters the one or more subsequent pipelined stages, and is arranged to read the second accumulate data word P from the register bank before the second operation enters the one or more subsequent pipelined stages, whereby both the accumulate data words O and P are available to the multiply-accumulate circuit when the second operation enters the one or more subsequent pipelined stages. Hence, by the time the second operation enters the one or more subsequent pipeline stages that are used for adding partial products and the accumulate values, both of the accumulate data words O and P are available.

In preferred embodiments, the first pipeline stage further includes a multiplexer for receiving the accumulate data words O and P from the register bank and the most significant W/2 bits of the first intermediate result, and being arranged, prior to the third operation entering the one or more subsequent pipelined stages, to output the most significant W/2 bits of the first intermediate result for use by the adder circuit in generating the fourth intermediate result. Accordingly, this multiplexer can be controlled to output appropriate values for inputting to the adder circuit, depending on the operation about to be executed by the adder circuit.

In accordance with preferred embodiments of the present invention, it is required that some shifting of the first intermediate result relative to the second intermediate result be performed prior to the two intermediate results being added together. In preferred embodiments, the apparatus further comprises a conditional shift circuit for receiving the intermediate result of a previous operation and for outputting either the least significant W bits of that intermediate result over left-shifted data paths into the adder circuit or the most significant W bits of that intermediate result over non-shifted data paths into the adder circuit. Hence, this conditional shift circuit can be arranged such that when the second operation is to be executed by the adder circuit, the first intermediate result is passed over shifted data paths into the adder circuit thereby enabling the second operation to be performed by the adder circuit. Equally, when a third operation is to be executed by the adder circuit, as required for a 2W bit result, the conditional shift circuit can be arranged to select non-shifted paths.

Whilst it is possible that the data word or data words representing the multiply-accumulate result could be written into registers entirely separate to those storing the input data words, in preferred embodiments of the present invention, the registers that store the input data words O and P also serve to store the data words of the multiply-accumulate result. This feature helps to reduce the bit space required for operand specification within the instruction.

It will be appreciated that W may be any appropriate value. However, in preferred embodiments, W=32, and accordingly the input data words are 32 bits in length.

Viewed from a second aspect, the present invention provides a method of processing data within a data processing apparatus having a multiplying circuit for performing a multiplication of a W/2 bit data value by a W bit data value, the method comprising the steps of: responsive to a multiply instruction, controlling said multiplying circuit to generate a multiplication result for the computation M×N, where M and N are W bit data words by: (i) executing a first operation in which the data word N is multiplied by the most significant W/2 bits of the data word M to generate a first intermediate result having 3W/2 bits; (ii) executing a second operation in which the data word N is multiplied by the least significant W/2 bits of the data word M to generate a second intermediate result having 3W/2 bits; and (iii) shifting the first intermediate result by W/2 with respect to the second intermediate result and adding the second intermediate result to generate the multiplication result.

Viewed from a third aspect, the present invention provides a computer program product carrying a computer program for controlling a data processing apparatus in accordance with the method of the second aspect of the present invention.

BRIEF DESCRIPTION OF THE DRAWINGS

The present invention will be described further, by way of example only, with reference to a preferred embodiment thereof as illustrated in the accompanying drawings, in which.

DETAILED DESCRIPTION

Figure 1:
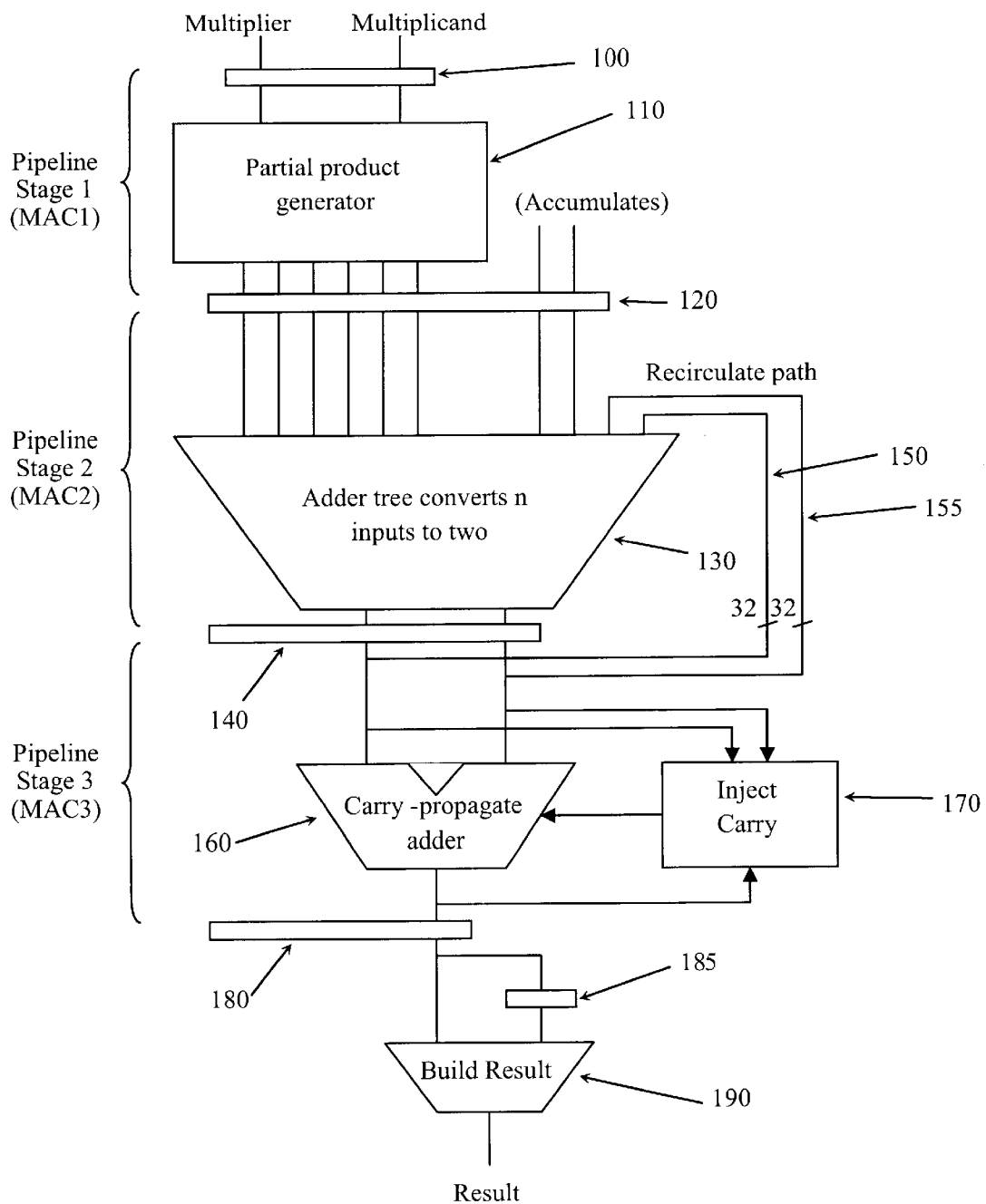
FIG. 1 is a block diagram illustrating a multiply-accumulate circuit arranged in a conventional manner.

FIG. 1 is block diagram illustrating a multiply-accumulate circuit that may be provided to execute multiply-accumulate instructions in a conventional manner. As can be seen from FIG. 1, the multiply-accumulate circuit basically comprises three pipelined stages, with some additional circuitry being provided after the third pipelined stage to generate a final multiply-accumulate result.

The multiply-accumulate circuit of FIG. 1 includes a partial product generator 110 which in combination with the adder tree 130 is able to produce the result for the multiplication of a W-bit multiplier by a W/2 bit multiplicand. The partial product receives the W-bit multiplier and W/2 bits of the multiplicand, and generates a series of partial products which are then added together within the adder tree 130 to generate the multiplication result. Accordingly two multiplication operations are required to perform the multiplication M×N, where both M and N are W-bit data words. For the purposes of describing the preferred embodiment, it will be assumed that W=32. The two operations can schematically be illustrated as follows:

| 1st Operation | | | | $M$ | $M$ | Multiplicand |
|---|---|---|---|---|---|---|
| × | | $N$ | $N$ | $N$ | $N$ | Multiplier |
| | $E$ | $E$ | $E$ | $E$ | $E$ | $E$ |
| | $F$ | $F$ | $F$ | $F$ | $F$ | $F$ |

| 2nd Operation | | | $M$ | $M$ | | Multiplicand |
|---|---|---|---|---|---|---|
| × | | $N$ | $N$ | $N$ | $N$ | Multiplier |
| + | | $E$ | $E$ | $E$ | $E$ | Upper 32 bits of $E$ |
| + | | $F$ | $F$ | $F$ | $F$ | Upper 32 bits of $F$ |
| + | | | | | $c$ | Carry |
| | $G$ | $G$ | $G$ | $G$ | $G$ | |
| | $H$ | $H$ | $H$ | $H$ | $H$ | |

In the above representation, each capital letter represents a byte, and accordingly MM represents 16 bits from the data word M, whilst NNNN represents all 32 bits of the data word N. As can be seen, the first operation multiplies the multiplier N by the least significant 16 bits of the multiplicand M, producing an intermediate result in redundant format of 48 bits, represented in redundant format as EEEEEE and FFFFFF.

With reference to FIG. 1, latches 100 receive the multiplicand M and the multiplier N prior to the first operation entering the first pipeline stage. After the first cycle, all of the partial products for the first operation as stored in latches 120, along with any accumulate values that are to be used. For ease of illustration, we will assume that the multiply-accumulate circuit is performing a pure multiplication, and that accordingly there are no accumulate values. In the second cycle, the adder tree 130 adds the partial products to generate the intermediate result in redundant form, which is then latched in the latches 140. Accordingly, with reference to the above schematic illustration, the 48 bit data values E and F are stored in latches 140 (which are 2×48 bits wide).

Also, during the second cycle, the partial product generator 110 generates the partial products for the multiplication specified by the second operation, with those partial products being latched in register 120.

In the third cycle, the first operation enters pipeline stage three, where the carry-propagate adder 160 generates the fully propagated intermediate result by adding E and F, this result being stored in the latch 180 (which is 48 bits wide) and also being input to the inject carry circuit 170. The redundant form of the intermediate result is also passed to the inject carry circuit 170, these values being used as described later to generate a carry signal for inputting to the carry-propagate adder when the second operation reaches the third pipeline stage.

As can be seen from FIG. 1, the top 32 bits of the intermediate result in redundant form are recirculated over paths 150 and 155 to the adder tree 130, which also receives the partial products from latches 120. Accordingly, in the third cycle, the adder 130 generates the intermediate result of the second operation, again in redundant form, with this intermediate result being stored in latches 140. Accordingly, with reference to the earlier schematic illustration of the second operation, the 48 bit data values G and H are stored in latches 140.

In the next cycle, the second operation enters the third pipeline stage, and the result of the first operation is passed to latch 185, and to build result multiplexer 190. Latch 185 stores the least significant 16 bits of the final result, and at this stage the build result multiplexer 190 does not output any value. With regard to the second operation in the third pipeline stage, the inject carry circuit 170 studies the redundant format of the intermediate result from the first operation, and the fully propagated result of the first operation to determine whether a carry would have occurred from the least significant 16 bits into the remaining bits of the result, and if so outputs a carry signal to the carry-propagate adder 160.

Hence, it can be seen that the carry-propagate adder 160 adds the 48 bit data values G and H to generate a fully propagated result for the second operation, also taking account of any carry signal output by the inject carry circuit 170. This result is then placed in the latch 180. The build result multiplexer 190 can then produce the final result by outputting the content of latches 185 as the least significant 16 bits of the result, and however many other bits of the result are required from the latches 180. Hence, if the multiplication instruction specifies a 32 bit result, then the upper 16 bits of the multiplication result are formed by the least significant 16 bits in latches 180. Similarly, if the multiplication instruction specifies a 64 bit result, then the upper 48 bits of the multiplication result are obtained from the contents of latches 180.

It should be noted that since the above described prior art approach multiplies the least significant 16 bits of the multiplicand with the multiplier during the first operation, then if a multiply-accumulate instruction is specified, the accumulate data words need to be available before the first operation enters the second pipeline stage.

Figure 2:
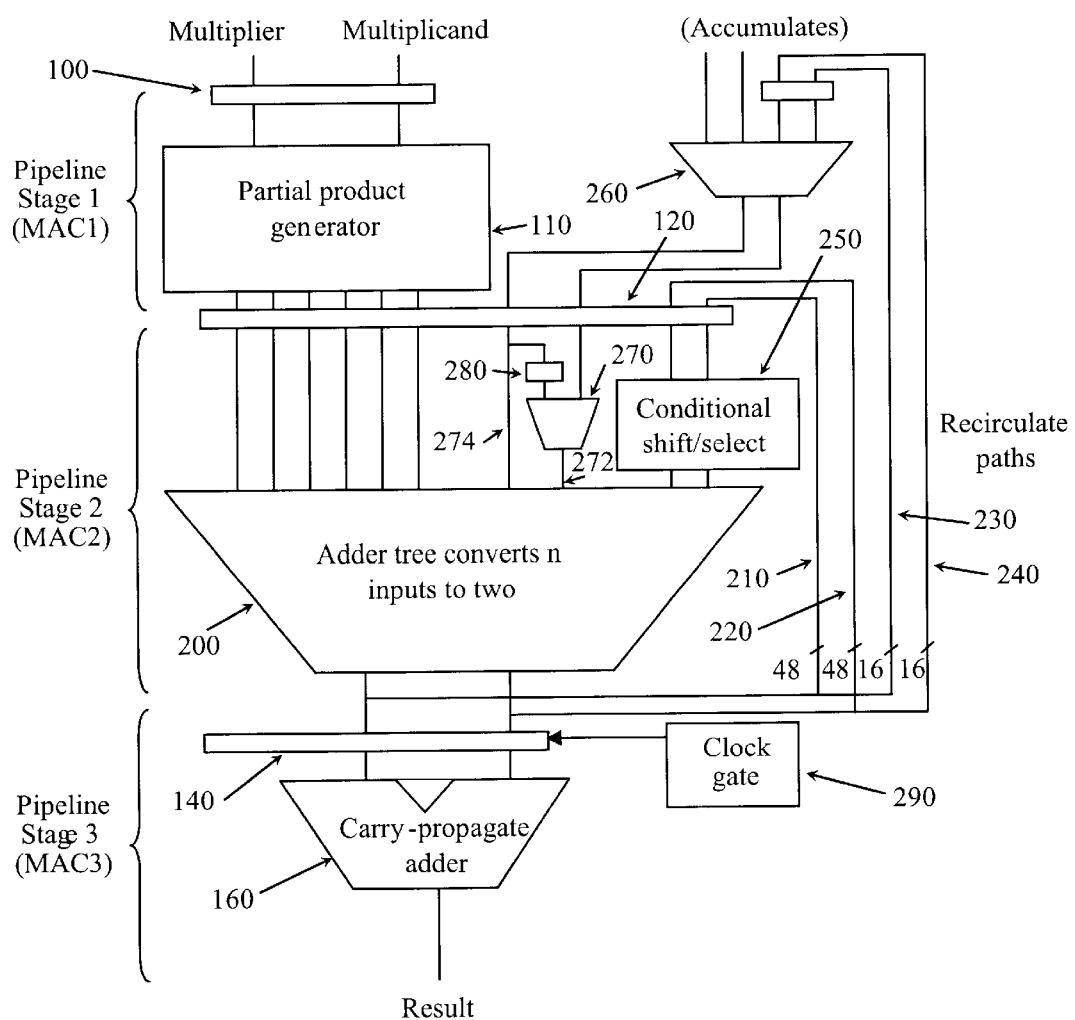
FIG. 2 is a block diagram illustrating a multiply-accumulate circuit of preferred embodiments of the present invention.

FIG. 2 is a block diagram illustrating a multiply-accumulate circuit in accordance with preferred embodiments of the present invention, which enables multiplications to be performed in reverse order. Considering first a pure multiply instruction of two 32 bit data words M and N, where the multiplication result is specified as being a 32 bit multiplication result, then the multiply-accumulate circuit of FIG. 2 may be arranged to perform the two operations identified below to produce the multiplication result:

| 1st Operation | | | | M | M | Multiplicand |
|---|---|---|---|---|---|---|
| | × | | N | N | N | N | Multiplier |
| | | E | E | E | E | E | E | |
| | | F | F | F | F | F | F | |

| 2nd Operation | | | | | M | M | Multiplicand |
|---|---|---|---|---|---|---|---|
| | × | | | N | N | N | N | Multiplier |
| | + | E | E | E | E | | | Lower 32 bits of $E$ |
| | + | F | F | F | F | | | Lower 32 bits of $F$ |
| | | G | G | G | G | G | G | |
| | | H | H | H | H | H | H | |

As with FIG. 1, both the multiplier and the multiplicand are stored in latches 100 prior to the first operation entering the first pipelined stage. In the first pipelined stage, the partial product generator 110 receives the multiplier N and the upper 16 bits of the multiplicand M, and generates a series of partial products, which are latched within the latches 120. The operation of the multiplexer 260 will be discussed later, but for the time being it is sufficient to note that since there are no accumulate values, the multiplexer 260 will output zeros for storage in the latch 120 at this time.

In the second cycle, the first operation enters the second pipeline stage, where the adder tree 200 produces a first intermediate result in redundant form for the first operation, and stores that intermediate result in the latches 140. Accordingly the latches 140 will store the two 48 bit data values E and F representing the redundant form of the first intermediate result. In this second cycle of the first operation, the outputs of the multiplexer 270 and the conditional shift circuit 250 are not relevant, and accordingly these elements will be discussed later.

Also in the second cycle, the second operation enters the first pipeline stage, and the partial product generator 110 receives the multiplier N and the least significant 16 bits of the multiplicand M, and generates the corresponding sequence of partial products which are stored within the latches 120. Again, the output of multiplexer 260 is not relevant at this stage, and accordingly will be discussed later.

In the third cycle, the latches 140 are disabled with a clock gate 290 and so the carry-propagate adder 160 will see no change on its inputs and will consume no power. This is done because no part of the first intermediate result will necessarily represent any bits of the final multiplication result and so should not be processed by the carry-propagate adder 160 at this time. Instead, all 48 bits are recirculated via path 210 and 220 for inputting to the conditional shift/select circuit 250 in the third cycle, and the upper 16 bits of the first intermediate result in redundant form are also passed over paths 230 and 240 for inputting to the multiplexer 260 in the third cycle. The multiplexer 260 is arranged when executing a multiplication instruction that specifies a 32 bit result to always output the inputs on the accumulate paths, and accordingly the recirculated 16 bit data values are not output from the multiplexer 260.

The conditional shift/select circuit 250 is arranged to output the most significant W bits of the data it receives on non-shifted data paths into the adder tree 200. However, when the second pipeline stage is processing the second operation of any instruction that requires the multiplication to be performed in reverse order, the conditional shift/select circuit 250 is arranged to output the least significant W bits of its inputs to shifted data paths within the adder tree 200. The shifted data paths are data paths that are provided within the adder tree 200 in accordance with preferred embodiments of the present invention to route the data to a location within the adder tree where that data is effectively treated as though it has been left shifted by 16 bits, thus facilitating execution of the second operation set out in the earlier schematic illustration.

Hence, in the third cycle, the second operation enters the second pipeline stage, where the partial products are output from latches 120, and then added together to produce internally within the adder tree 200 a second intermediate result. However, the adder tree also adds this second intermediate result with the logically shifted lower 32 bits of the first intermediate result, this generating a third intermediate result in redundant form which is stored in the latches 140. Accordingly, with reference to the earlier schematic illustration of the second operation, the 48 bit data values G and H are stored in the latches 140. Since the relevant bits of the first intermediate result have been recirculated for inclusion in the generation of the third intermediate result, it is clear that the third intermediate result incorporates directly the lower 32 bits of the multiplication result. Accordingly, in the next cycle, the clock gate 290 is arranged to ensure that the latches 140 transfer data values G and H to the inputs of the carry-propagate adder 160, whereby the carry-propagate adder 160 generates a fully propagated result from the third intermediate result in redundant form. The lower 32 bits of that result are the required multiplication result.

When the FIG. 2 circuitry is arranged to perform a pure multiply instruction that specifies a 64 bit result, then three operations are required, as schematically illustrated below:

$$
\begin{array}{rl}
1^{st} \text{ Operation} & \begin{array}{cccccc} & & M & M & & \\ \times & & N & N & N & N \\ \hline E & E & E & E & E & E \\ F & F & F & F & F & F \end{array} \begin{array}{l} \text{Multiplicand} \\ \text{Multiplier} \end{array} \\
\\
2^{nd} \text{ Operation} & \begin{array}{cccccc} & & & M & M & \\ \times & & N & N & N & N \\ + & E & E & E & E & \\ + & F & F & F & F & \\ \hline G & G & G & G & G & G \\ H & H & H & H & H & H \end{array} \begin{array}{l} \text{Multiplicand} \\ \text{Multiplier} \\ \text{Lower 32 bits of } E \\ \text{Lower 32 bits of } F \end{array} \\
\\
3^{rd} \text{ Operation} & \begin{array}{cccccc} & & G & G & G & G \\ & & H & H & H & H \\ & E & E & & & \\ & F & F & & & \\ \hline J & J & J & J & J & J \\ K & K & K & K & K & K \end{array} \begin{array}{l} \text{Upper 32 bits of } G \\ \text{Upper 32 bits of } H \\ \text{Upper 16 bits of } E \\ \text{Upper 16 bits of } F \end{array}
\end{array}
$$

It will be seen that the first two operations are identical to the two operations required to produce a W bit multiplication result, and accordingly they will not be discussed again in detail here. However, from the earlier discussion, it will be recalled that the top 16 bits of the first intermediate result are routed over paths 230 and 240 for inputting to the multiplexer 260 in the third cycle. Also in the third cycle, the third operation nominally begins execution. However, since the third operation does not involve any multiplications, the partial product generator is arranged to output zeros to the adder tree 200. However, at this point, the multiplexer 260 receives a select signal which causes it to output the data on recirculated paths 230 and 240, rather than any data on the input accumulate paths. Accordingly, at the end of the third cycle the latches 120 will store the upper 16 bits of the first intermediate result, i.e. the upper 16 bits of E and F.

In the next cycle, in addition to the second operation entering the third pipelined stage as discussed earlier, the third operation enters the second pipeline stage. The multiplexer 270 is arranged to select the input directly from latch 120 rather than from latch 280, and accordingly the upper 16 bits of the first intermediate result (i.e. the upper 16 bits of E and F) are passed directly into the adder tree 200. In addition, the conditional shift/select circuit 250 receives over paths 210 and 220 the third intermediate result in redundant form, i.e. G and H, and passes the most significant 32 bits of that data unshifted into the adder tree 200. This enables the adder tree 200 to perform the third operation to generate a fourth intermediate result in redundant form which is stored within the latches 140.

In the next cycle, the carry-propagate adder 160 will then generate a fully propagated result from the fourth intermediate result, with the upper 32 bits of that result representing the upper 32 bits of the multiplication result. As discussed earlier with reference to a multiplication instruction producing a W bit result, the lower 32 bits of the multiplication result will be given by the output of the adder 160 in the previous cycle (i.e. based on the third intermediate result).

Figure 3:
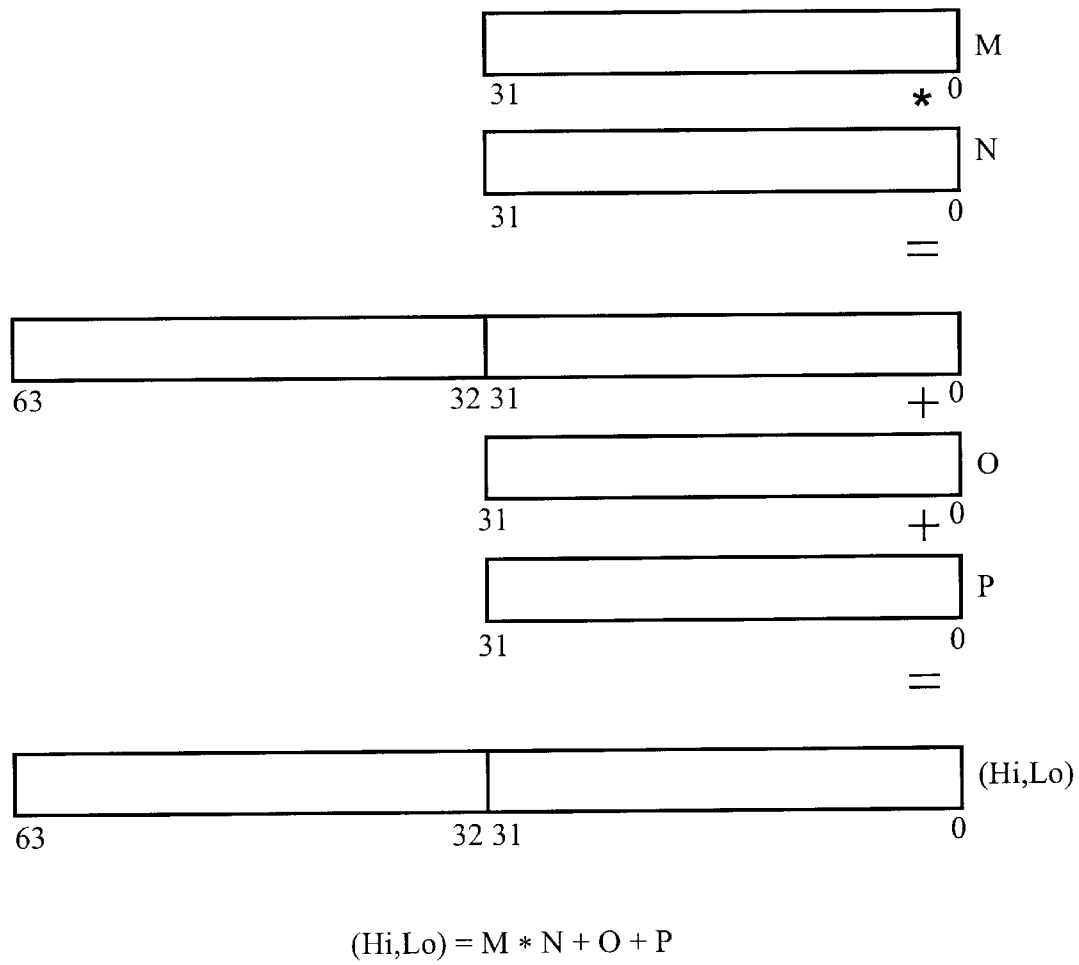
FIG. 3 schematically illustrates the data processing computation performed by a multiply double accumulate instruction.
Figure 4:
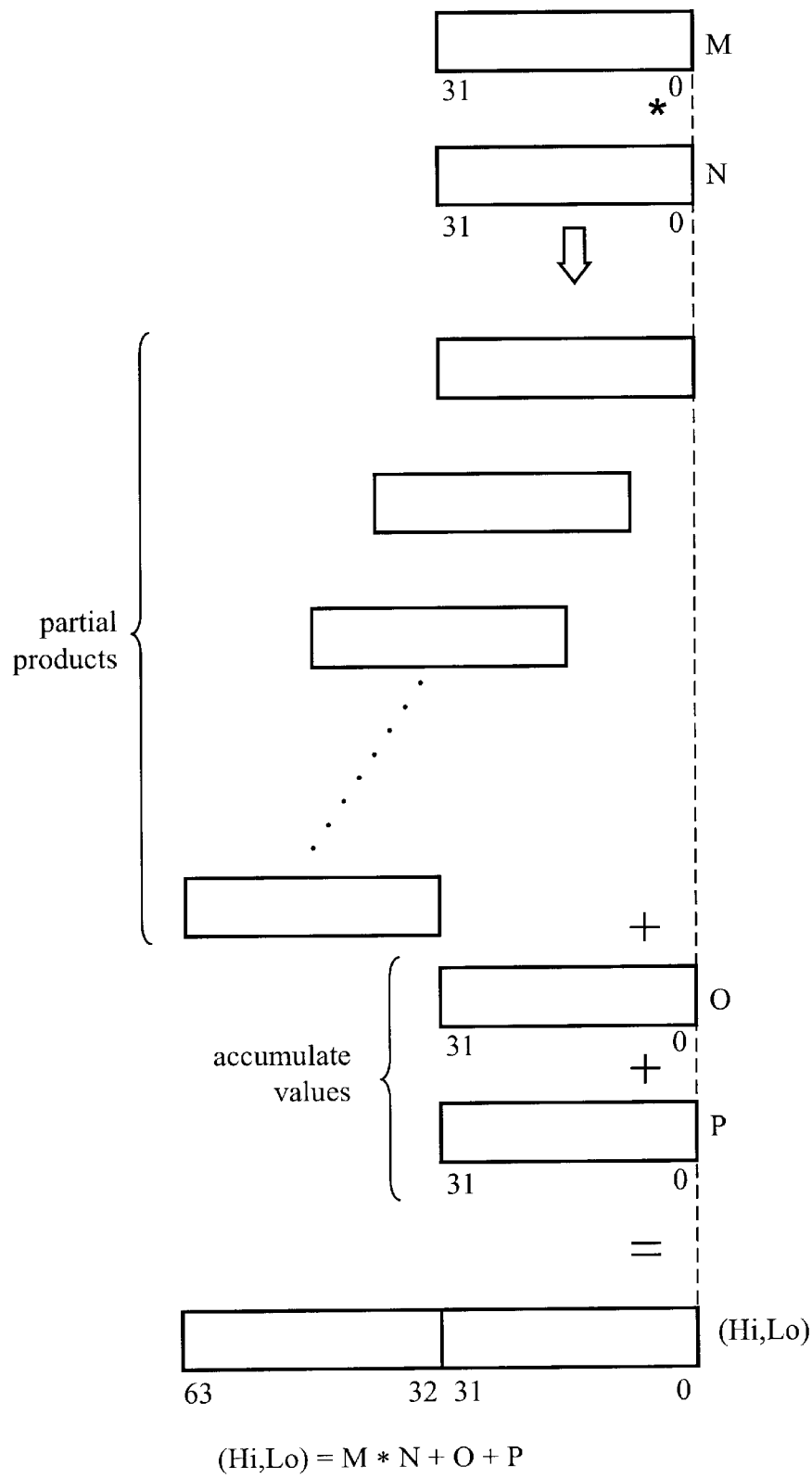
FIG. 4 schematically illustrates the operation of a multiply double accumulate instruction where the determination involves the calculation of a plurality of partial products.

The multiply-accumulate circuit of FIG. 2 may also be used to execute multiply-accumulate instructions as well as pure multiply instructions. A typical multiply-accumulate instruction specifies a computation of the form M×N+O, with the accumulate data word being input to multiplexer 260 and output from the multiplexer 260 to the latches 120 prior to the operation utilising that accumulate data word being passed into the second pipeline stage. However, it should also be noted that the FIG. 2 circuitry provides support for executing a new type of multiply-accumulate instruction called a multiply double accumulate instruction. This multiply double accumulate instruction performs a computation M×N+O+P, and the instruction has the advantages that it is resistant to overflow and provides enough accumulate values to be highly useful in synthesising multi-precision multiplies and other functions. FIGS. 3 and 4 schematically illustrate such a multiply double accumulate instruction.

FIG. 3 illustrates a first 32-bit input value M being multiplied by a second 32-bit input value N to generate a 64-bit multiplication result. Once the multiplication result has been determined, then the two 32-bit accumulate input values O and P may be added to generate the final result. The final result is a 64-bit value. Different bit widths may be used, e.g. 64-bit input operands and 128-bit result.

The multiplication performed is preferably an unsigned multiplication. It will be appreciated that whilst the different mathematical operations have been illustrated separately within FIG. 3, in practice different parts of each calculation can be split up and overlapped or combined in accordance with the normal practices of computer arithmetic. Different possibilities for the ways in which the instruction illustrated in FIG. 3 may be implemented will be apparent to those skilled in the art of computer arithmetic.

FIG. 4 schematically illustrates the way in which the multiply double accumulate may be broken down to be provided in the form of the calculation of a plurality of partial products that are added together to produce the multiplication result together with the addition into this result of the two accumulate values. The way in which the partial products are evaluated and the points in the processing at which the accumulate values are added in can vary considerably in accordance with standard techniques.

Figure 5:
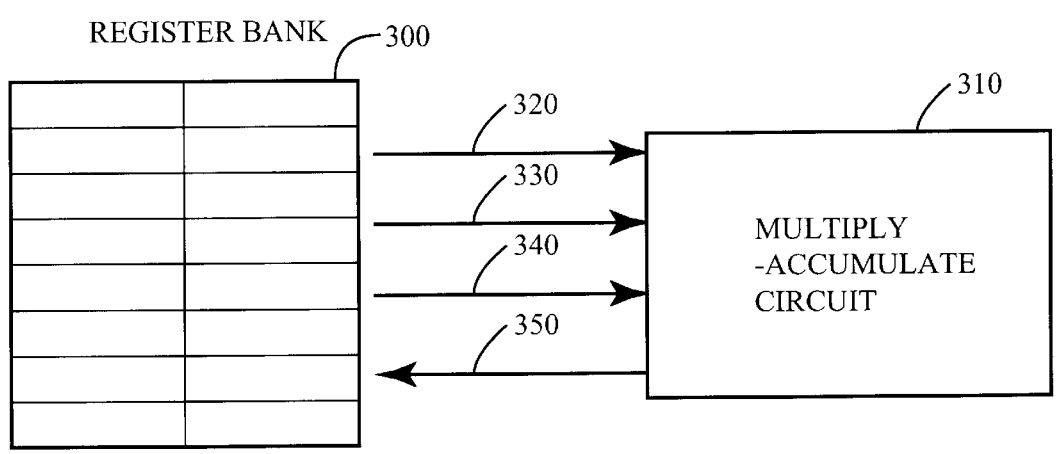
FIG. 5 illustrates the connections between a register bank 300 and a multiply-accumulate circuit 310 in accordance with preferred embodiments of the present invention.

One potential problem that arises when trying to execute a multiply double accumulate instruction of the above type is apparent when considering FIG. 5, which illustrates the typical connections between a multiply-accumulate circuit 310 and a register bank 300 used to store the data words required by the multiply-accumulate circuit. The register bank 300 contains a plurality of registers that may serve to store the input operands for the multiply-accumulate circuit and also to store the result values produced by the multiply-accumulate circuit. In a preferred embodiment, the registers storing the input operands O and P also serve to store the multiply-accumulate 64 bit result, and are overwritten by this result value. In the illustrated example, there are sixteen registers within the register bank 300 and accordingly each register specifying operand within the multiply double accumulate instruction requires 4 bits. As 4 registers are specified within the multiply double accumulate instruction, this consumes 16 bits of a 32 bit instruction with the remaining 16 bits being used to specify the opcode for the multiply double accumulate instruction, the condition code flags and various other variable parameters of the instruction as required.

Figure 6A:
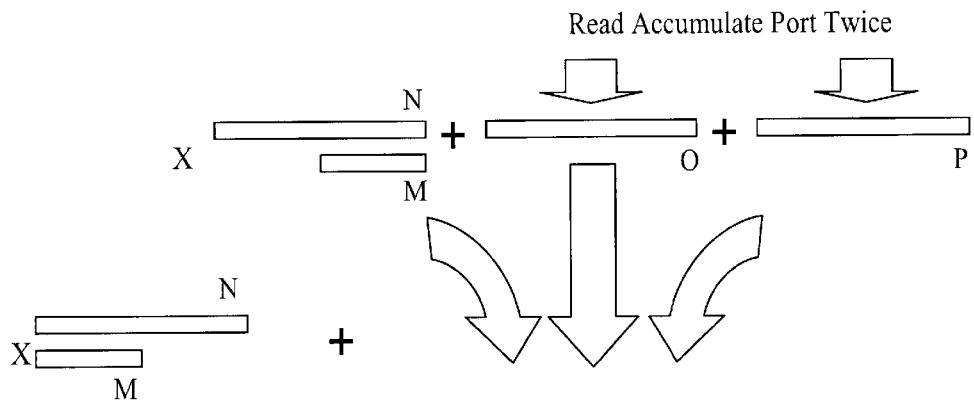
FIG. 6A schematically illustrates how a multiply double accumulate instruction might be executed within a multiply-accumulate circuit that performs multiplication in the conventional manner.

The problem that potentially occurs when trying to execute a multiply double accumulate instruction is that the register bank only has three read ports. If the least significant bits of the multiplication were to be performed by the first operation, then it is apparent that the two accumulate data words O and P would also be required before that first operation entered the second pipeline stage of the multiply-accumulate circuit (i.e. the stage containing the adder tree). However, assuming the multiplier and multiplicand will use up two of the read ports, it is clear that only one of the accumulate data words can be read out at once. With a conventional multiply-accumulate circuit that only facilitates performing the multiplications in the conventional order, it is clear that it will be necessary to insert a stall cycle whilst the other accumulate data word is retrieved. This problem can be seen from FIG. 6A, which is a schematic illustration of the process that would be performed within such a conventional multiply-accumulate circuit. Data words O and P cannot be made available at the same time, and thus there is a requirement for a stall cycle.

Figure 6B:
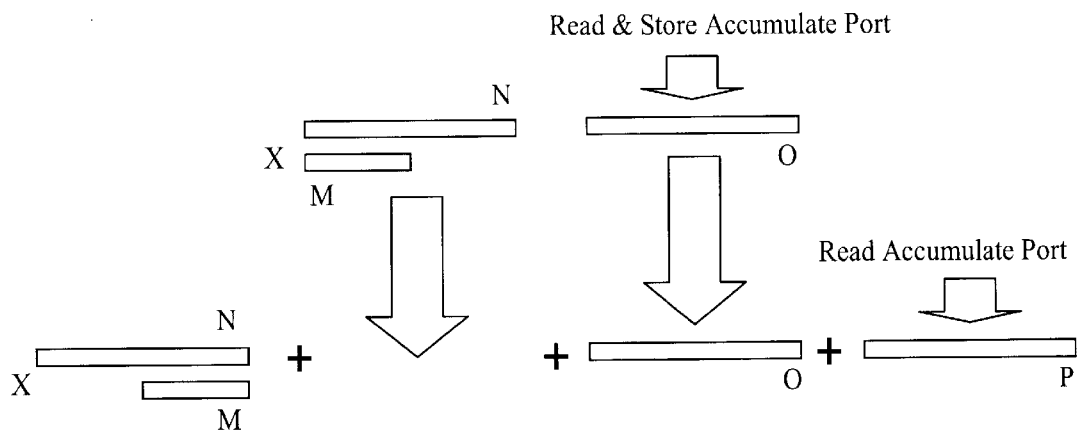
FIG. 6B schematically illustrates how a multiply double accumulate instruction is executed within a multiply-accumulate circuit in accordance with preferred embodiments of the present invention.

FIG. 6B schematically illustrates how the multiply-accumulate circuit of preferred embodiments of the present invention, which facilitates execution of the multiplication in reverse order, overcomes this problem. As shown in FIG. 6B, the data word O can be read from the register bank and stored prior to the first operation entering the second pipeline stage. The data word O is not actually required by the first operation, and hence is merely stored for use subsequently. Then, prior to the second operation entering the second pipeline stage, the data word P can be read from port C (i.e. the third port) of the register bank, whereby both the data words O and P are available when the second operation enters the second pipeline stage.

The execution of a multiply double accumulate instruction within the multiply-accumulate circuit of FIG. 2 will now be discussed. Three operations are required to perform the multiply double accumulate instruction, as illustrated schematically below:

| | | | | | | | | |
|---|---|---|---|---|---|---|---|---|
| 1st Operation | | | | | M | M | | Multiplicand |
| | × | | | N | N | N | N | Multiplier |
| | | E | E | E | E | E | E | |
| | | F | F | F | F | F | F | |
| 2nd Operation | | | | | M | M | | Multiplicand |
| | × | | | N | N | N | N | Multiplier |
| | + | E | E | E | E | | | Lower 32 bits of E |
| | + | F | F | F | F | | | Lower 32 bits of F |
| | + | | O | O | O | O | | 1st Accumulate value |
| | + | | | P | P | P | P | 2nd Accumulate value |
| | | G | G | G | G | G | G | |
| | | H | H | H | H | H | H | |

-continued

| | | | | | | |
|---|---|---|---|---|---|---|
| 3rd Operation | | | G | G | G | G | Upper 32 bits of G |
| | | | H | H | H | H | Upper 32 bits of H |
| | E | E | | | | | Upper 16 bits of E |
| | F | F | | | | | Upper 16 bits of F |
| | J | J | J | J | J | J | |
| | K | K | K | K | K | K | |

The first operation is as discussed earlier, and accordingly will not be discussed further here. However it should be noted that prior to the first operation entering the second pipeline stage, the accumulate data word O is passed to the multiplexer 260 and routed from the multiplexer 260 to the latches 120. In the next cycle, the data word O is stored in the latch 280, and the data word P is read from the register bank into the multiplexer 260, and passed from there to the latches 120. During this cycle, the second operation is also being processed in the first pipeline stage and according a number of partial products are also stored in the latches 120. When the second operation enters the second pipeline stage, the multiplexer 270 is arranged to select the contents of latch 280 as its output, and accordingly the data word O is passed over path 272 into the adder tree 200, whilst the data word P is passed over path 274 into the adder tree 200.

Further, as already mentioned earlier, the lower 32 bits of the first intermediate result are output by the conditional shift/select circuit 250 over shifted data paths into the adder tree to be incorporated into the addition performed by the adder tree 200. This enables both the accumulate data words O and P and the lower 32 bits of the first intermediate result to be added to the second intermediate result representing the multiplication of the multiplier N with the lower 16 bit of the multiplicand M, thereby producing a third intermediate result which is stored within the latches 140. Accordingly, this intermediate result in redundant form is represented by the 48 bit data values G and H. The lower 32 bits of the multiply-accumulate result are then represented by the lower 32 bits of this third intermediate result, and the fully propagated result for those 32 bits is then calculated in the subsequent cycle by the carry-propagate adder 160.

The third operation required is then identical to that discussed earlier when describing a multiply instruction used to generate a 64 bit result, and accordingly will not be discussed further here.

For completeness, it should be noted that the accumulate paths input to the multiplexer 260 need not be accumulate values read from the register bank, but in some situations can actually be constant terms, for example rounding values that may be selected as and when required.

It should also be noted that the multiply-accumulate circuit of FIG. 2, whilst supporting instructions where the multiplication is performed in reverse order, also maintains support for instructions that perform the multiplication in the conventional order. As can be seen from comparing FIG. 1 and FIG. 2, the basic recirculate path from the third stage into the second stage is still provided, and the conditional shift circuit 250 will merely be arranged when executing instructions that do the multiply in the conventional order not to output the recirculated data to shifted data paths, but merely to output them on normal unshifted data paths. Of course, if it was desired to maintain the flexibility to support such conventional multiplication instructions with the FIG. 2 circuitry, then it will typically be necessary to maintain an inject carry circuit 170 in the third pipeline stage, and depending on the multiplication instruction it may also be necessary to provide some subsequent build result multiplexer 190.

In preferred embodiments, the following instructions are arranged to cause the multiplication to be performed in reverse order by the multiply-accumulate circuit of FIG. 2:

MUL 32×32→32
MLA 32×32+32→32
SMULL 32×32→64
SMLAL 32×32+64→64
UMULL 32×32→64
UMLAL 32×32+64→64
UMAAL 32×32+32+32→64

The first four instructions are arranged to operate on signed data values, whilst the last three instruction are arranged to operate on unsigned data values. It will be appreciated that the above list is not an exhaustive list of instructions that may benefit from producing the two parts of the multiplication in reverse order, but merely are intended to provide an illustration of example instructions.

Although a particular embodiment has been described herein, it will be appreciated that the invention is not limited thereto and that many modifications and additions thereto may be made within the scope of the invention. For example, various combinations of the features of the following dependent claims can be made with the features of the independent claims without departing from the scope of the present invention.

I claim:

1. Apparatus for processing data, comprising:
   a multiplying circuit including:
      an adder tree for performing multiplication and addition operations in order to generate an output of size 3W/2 bits, and
      at least one recirculate path for routing selected bits of said output to an input of said adder tree, and
   an instruction decoder responsive to a multiply instruction to control said multiplying circuit to generate a multiplication result for the computation M×N, where M and N are W bit data words,
   wherein the multiplying circuit is arranged to execute a first operation in which the data word N is multiplied by the most significant W/2 bits of the data word M to generate a first intermediate result having 3W/2 bits, and to then execute a second operation in which the data word N is multiplied by the least significant W/2 bits of the data word M to generate a second intermediate result having 3W/2 bits,
   wherein the mulitiplying circuit is arranged to shift the first intermediate result by W/2 with respect to the second intermediate result, and
   wherein the adder tree is arranged to add the shifted first intermediate result to the second intermediate result to generate the multiplication result.

2. Apparatus as claimed in claim 1, wherein the multiply instruction specifies a W bit multiplication result, and the multiplying circuit is further arranged to execute the second operation to sum the least significant W bits of the first and second intermediate result to generate a third intermediate result having 3W/2 bits, the multiplication result being given by the least significant W bits of the third intermediate result.

3. Apparatus as claimed in claim 1, wherein the multiply instruction specifies a 2W bit multiplication result, to cause the multiplying circuit is further arranged to execute the second operation to sum the least significant W bits of the first and second intermediate result to generate a third intermediate result having 3W/2 bits, and the multiplying circuit is further arranged to execute a third operation in which the most significant W-bits of the third intermediate result and the most significant W/2 bits of the first intermediate result are summed to generate a fourth intermediate result having 3W/2 bits, the multiplication result being given by the least significant W bits of the third intermediate result and the most significant W bits of the fourth intermediate result.

4. Apparatus as claimed in claim 1, further comprising:
   a register bank containing a plurality of registers for storing data words required by the multiplying circuit;
   wherein the multiplying circuit is a pipelined circuit comprising a partial product generating circuit provided in a first pipelined stage and said adder tree provided in one or more subsequent pipelined stages for adding partial product values, wherein the multiplying circuit is arranged to read from the register bank data words required for an operation at a particular pipelined stage before that operation enters that pipelined stage.

5. Apparatus as claimed in claim 1, wherein the multiplying circuit is a multiply-accumulate circuit, and said multiply instruction is a multiply-accumulate instruction specifying at least one W bit accumulate data word O in addition to the data words M and N, the instruction decoder being responsive to the multiply-accumulate instruction to control said multiply-accumulate circuit to generate a multiply-accumulate result for the computation M×N+O, the multiply-accumulate circuit being arranged to execute the first operation to generate the first intermediate result having 3W/2 bits, and the multiply-accumulate circuit is arranged to execute the second operation to the at least one accumulate data word O with the result of the multiplication of the data word N by the least significant W/2 bits of the data word M to generate a second intermediate result having 3W/2 bits, the first intermediate result being shifted by W/2 with respect to the second intermediate result and added by the adder tree to the second intermediate result to generate the multiply-accumulate result.

6. Apparatus as claimed in claim 5, wherein the multiply-accumulate instruction specifies a W bit multiply-accumulate result, and the multiply-accumulate circuit is arranged to execute the second operation to sum the least significant W bits of the first and second intermediate result to generate a third intermediate result having 3W/2 bits, the multiplication result being given by the least significant W bits of the third intermediate result.

7. Apparatus as claimed in claim 5, wherein the multiply-accumulate instruction specifies a 2W bit multiply-accumulate result, and the multiply-accumulate circuit is arranged to execute the second operation to sum the least significant W bits of the first and second intermediate result to generate a third intermediate result having 3W/2 bits, and the multiply-accumulate circuit is further arranged to execute a third operation in which the most significant W-bits of the third intermediate result and the most significant W/2 bits of the first intermediate result are summed to generate a fourth intermediate result having 3W/2 bits, the multiply-accumulate result being given by the least significant W bits of the third intermediate result and the most significant W bits of the fourth intermediate result.

8. Apparatus as claimed in claim 7, wherein the multiply-accumulate instruction specifies a 2W bit accumulate data value in two data words O and P, where data word O represents the most significant W bits of the accumulate data value and data word P represents the least significant W bits of the accumulate data value, the first operation including the summation of data word O into the multiplication, and the second operation including the summation of data word P into the multiplication.

9. Apparatus as claimed in claim 7, wherein the multiply-accumulate instruction specifies two W bit accumulate data words O and P, and the multiply-accumulate circuit is arranged to execute the second operation to sum both accumulate data words into the multiplication.

10. Apparatus as claimed in claim 9, further comprising:
a register bank containing a plurality of registers for storing data words required by the multiplying circuit;
wherein the multiply-accumulate circuit is a pipelined circuit including:
a partial product generating circuit provided in a first pipelined stage, and
said adder tree provided in one or more subsequent pipelined stages for adding partial product and accumulate values, and
wherein the multiply-accumulate circuit is arranged to read from the register bank data words required for an operation at a particular pipelined stage before that operation enters that pipelined stage.

11. Apparatus as claimed in claim 10, wherein the register bank has three read ports, the multiply-accumulate circuit being arranged to read the first accumulate data word O from the register bank before the first operation enters the one or more subsequent pipelined stages, and being arranged to read the second accumulate data word P from the register bank before the second operation enters the one or more subsequent pipelined stages, whereby both the accumulate data words O and P are available to the multiply-accumulate circuit when the second operation enters the one or more subsequent pipelined stages.

12. Apparatus as claimed in claim 11, wherein the first pipelined stage further comprises a multiplexer for receiving the accumulate data words O and P from the register bank and the most significant W/2 bits of the first intermediate result, and being arranged, prior to the third operation entering the one or more subsequent pipelined stages, to output the most significant W/2 bits of the first intermediate result for use by the adder tree in generating the fourth intermediate result.

13. Apparatus as claimed in claim 10, further comprising a conditional shift circuit for receiving the intermediate result of a previous operation and for outputting either the least significant W bits of that intermediate result over left-shifted data paths into the adder tree or the most significant W bits of that intermediate result over non-shifted data paths into the adder tree.

14. Apparatus as claimed in claim 10, wherein those registers that store said data words O and P are also arranged to store said multiply-accumulate result.

15. Apparatus as claimed in claim 1, wherein W=32.

16. A method of processing data within a data processing apparatus having a multiplying circuit including:
an adder tree for performing multiplication and addition operations in order to generate an output of size 3W/2 bits, and
at least one recirculate path for routing selected bits of said output to an input of said adder tree, and
the method comprising:
responsive to a multiply instruction, controlling said multiplying circuit to generate a multiplication result for the computation M×N, where M and N are W bit data words, by:
(i) executing a first operation in which the data word N is multiplied by the most significant W/2 bits of the data word M to generate a first intermediate result having 3W/2 bits;
(ii) executing a second operation in which the data word N is multiplied by the least significant W/2 bits of the data word M to generate a second intermediate result having 3W/2 bits; and
(iii) shifting the first intermediate result by W/2 with respect to the second intermediate result and adding within the adder tree the second intermediate result to generate the multiplication result.

17. A computer program product carrying a computer program for controlling a data processing apparatus in accordance with the method of claim 16.

* * * * *